(12) United States Patent
Lang et al.

(10) Patent No.: US 12,671,281 B2
(45) Date of Patent: Jun. 30, 2026

(54) ROTOR COMPRISING A TWO-PART BEARING SEAT

(71) Applicant: Bayerische Motoren Werke Aktiengesellschaft, Munich (DE)

(72) Inventors: Markus Lang, Munich (DE); Robert Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 222 days.

(21) Appl. No.: 18/699,036

(22) PCT Filed: Jan. 10, 2023

(86) PCT No.: PCT/EP2023/050463
§ 371 (c)(1),
(2) Date: Apr. 5, 2024

(87) PCT Pub. No.: WO2023/143905
PCT Pub. Date: Aug. 3, 2023

(65) Prior Publication Data
US 2025/0233466 A1 Jul. 17, 2025

(30) Foreign Application Priority Data
Jan. 25, 2022 (DE) ..................... 10 2022 101 650.1

(51) Int. Cl.
*H02K 1/24* (2006.01)
*H01R 39/12* (2006.01)
(Continued)

(52) U.S. Cl.
CPC .............. *H02K 1/24* (2013.01); *H01R 39/12* (2013.01); *H02K 7/083* (2013.01); *H02K 13/003* (2013.01); *H02K 13/02* (2013.01)

(58) Field of Classification Search
CPC ........ H01R 39/08; H01R 39/12; H01R 39/34; H02K 1/24; H02K 13/003; H02K 13/02; H02K 5/1732; H02K 7/083
See application file for complete search history.

(56) References Cited

U.S. PATENT DOCUMENTS

2016/0020681 A1* 1/2016 Henger ..................... H02K 7/08
310/72
2016/0164380 A1* 6/2016 Deak .................... H02K 13/003
310/71

FOREIGN PATENT DOCUMENTS

CN 1601867 A 3/2005
DE 29 45 314 A1 5/1981
(Continued)

OTHER PUBLICATIONS

FR-3039938-A1, all pages (Year: 2017).*
(Continued)

*Primary Examiner* — Naishadh N Desai
(74) *Attorney, Agent, or Firm* — Crowell & Moring LLP

(57) ABSTRACT

An assembly for a rotor of an electrically excited electric machine includes a rotor shaft, a slip ring, and two bearing points. The rotor shaft is fixedly connectable to a rotor core of the rotor to thereby conjointly rotate. The slip ring module has at least one slip ring configured to energize rotor windings of the rotor. The two bearing points are arranged at axial ends of the rotor shaft with one annular bearing seat of one bearing of the rotor. One of the bearing points is of two-part configuration. The two part bearing points with the part bearing seats are connected in a positively locking and non-positive manner with configuration of the bearing point with the annular bearing seat.

9 Claims, 7 Drawing Sheets

(51) Int. Cl.
| | | |
|---|---|---|
| *H02K 7/08* | (2006.01) |
| *H02K 13/00* | (2006.01) |
| *H02K 13/02* | (2006.01) |

(56) References Cited

FOREIGN PATENT DOCUMENTS

| | | | | |
|---|---|---|---|---|
| DE | 10 2014 213 698 A1 | 1/2016 | | |
| DE | 10 2014 225 236 A1 | 6/2016 | | |
| FR | 3039938 A1 * | 2/2017 | ............ | H02K 13/02 |
| JP | 05130757 A * | 5/1993 | | |
| WO | WO-2014069361 A1 * | 5/2014 | ............ | F16K 31/04 |

OTHER PUBLICATIONS

JP-05130757-A, all pages (Year: 1993).*
WO-2014069361-A1, allpages (Year: 2014).*
International Search Report (PCT/ISA/210) issued in PCT Application No. PCT/EP2023/050463 dated Apr. 13, 2023 with English translation (5 pages).
German-language Written Opinion (PCT/ISA/237) issued in PCT Application No. PCT/EP2023/050463 dated Apr. 13, 2023 with English translation (10 pages).
German-language Search Report issued in German Application No. 10 2022 101 650.1 dated May 8, 2023 with partial English translation (11 pages).

* cited by examiner

ROTOR COMPRISING A TWO-PART BEARING SEAT

BACKGROUND AND SUMMARY

The disclosure relates to an assembly for a rotor of an electric machine having a rotor shaft which can be connected fixedly to a rotor core of the rotor for conjoint rotation, a slip ring module having at least one slip ring for energizing rotor windings of the rotor, and two bearing points which are arranged at axial ends of the rotor shaft with in each case one annular bearing seat for in each case one bearing of the rotor. Moreover, the disclosure relates to a rotor with an assembly of this type.

In the present case, interest is directed to electric machines which can be used, for example, as drive machines of electrified motor vehicles. The electric machines usually have a stationary stator and a rotor which is mounted by means of two bearings rotatably with regard to the stator. Both the rotor and the stator have components which generate magnetic fields and are held by a rotor core and stator core, respectively. The rotor has a rotor shaft which is connected fixedly to the rotor core for conjoint rotation for the transmission of torque to a drive axle of the motor vehicle. Here, the bearings are usually fastened to bearing points which are arranged at axially opposite ends of the rotor shaft. In the case of an electrically excited machine, the rotor has rotor windings as the component which generates magnetic fields. In order to energize the rotor windings, the rotor has a slip ring module with at least one slip ring.

Here, the slip rings are usually separated spatially from the rotor core and the stator core. As a result, the current has to be conducted from the slip rings via a current-conducting line under one of the bearing points through to the rotor windings. As a result, the rotor shaft is of two-part configuration. As a result of this two-part nature of the rotor shaft, there are jumps in the rigidities on the drive axle which can lead to increased vibrations during dynamic operation of the electric machine. This leads to an increase in the bearing forces and therefore to problems with the service life and to acoustically undesired excitations in the entire drive.

It is an object of the present disclosure to provide a rotor design which is improved in comparison with the prior art.

According to the disclosure, this object is achieved by way of an assembly and a rotor with the features according to the respective independent patent claims. Advantageous embodiments of the disclosure are the subject matter of the dependent patent claims, the description and the figures.

An assembly according to the disclosure for a rotor of an electrically excited electric machine has a rotor shaft which can be connected fixedly to a rotor core of the rotor for conjoint rotation, a slip ring module having at least one slip ring for energizing rotor windings of the rotor, and two bearing points arranged at axial ends of the rotor shaft with in each case one annular bearing seat for in each case one bearing of the rotor. One of the bearing points is of two-part configuration, a first part bearing point having a part bearing seat and being configured in one part with the rotor shaft, and a second part bearing point having a second part bearing seat and being configured in one part with the slip ring module. The two part bearing points with the part bearing seats are connected in a positively locking and non-positive manner with configuration of the bearing point with the bearing seat.

Moreover, the disclosure includes a rotor for an electric machine with a rotor core, rotor windings, two bearings and an assembly according to the disclosure. Here, the rotor shaft is connected fixedly for conjoint rotation to the rotor core which can be configured, for example, as a laminated core consisting of axially stacked and mechanically connected electric laminations. The bearing points for the bearings for making the rotational movement of the rotor with respect to the stator possible are arranged at the two axially opposite ends of the rotor shaft. Moreover, the slip ring module is connected fixedly to the rotor shaft for conjoint rotation. Here, that bearing point which faces the slip ring module is of two-part configuration, the first part bearing point being configured in one part or in one piece with the rotor shaft. In particular, the first part bearing point is configured by way of a shaped, axial end of the rotor shaft. In other words, one of the axial ends is machined and formed in such a way that the result is the first part bearing point. Here, the first part bearing point has a first part or portion of the bearing seat, that is to say the first part bearing seat.

The slip ring module has, in particular, two slip rings which are connected via connector wires to the rotor windings in order to feed in and discharge an exciter current for the rotor windings, it being possible for the slip rings to be energized via a stationary brush module. The slip ring module is configured in one part with the second part bearing point. To this end, the at least one slip ring can be connected, for example cast, in a manner which is non-releasable without destruction to a main body which configures regions of the second part bearing point. The second part bearing point has the second part or portion of the bearing seat, that is to say the second part bearing seat. The two part bearing points are connected mechanically to one another with configuration of the bearing point, and are joined in such a way that the result is the annular bearing seat for the bearing. The slip ring module and the rotor shaft are also connected mechanically by way of the connection of the part bearing points.

The connector wires of the slip ring module for energizing the rotor windings are preferably integrated into the second part bearing point, the connector wires being guided through the bearing point in the connected state of the two part bearing points. Here, the mechanical connection is a positively locking connection, preferably a plug-in connection which can be plugged axially, and a non-positive connection, preferably a press fit.

The disclosure affords the advantage that a two-part rotor shaft with the above-described disadvantages can be dispensed with.

It can be provided here that the two part bearing points engage into one another in a claw-like manner in order to provide the positively locking connection. In particular, the annular bearing seat is segmented along the circumferential direction, each part bearing point having segments of the bearing seat. These segments are combined to form the annular bearing seat by way of joining of the part bearing points. To this end, the first part bearing point has, in particular, two circular segment-shaped parts which are separated by way of longitudinal slots. The second part bearing point is configured by way of two fork limbs of a fork-shaped main body which are pushed axially into the longitudinal slots. An exterior shape of the fork limbs at least in the region of the second part bearing seat corresponds to an exterior shape of the circular segment-shaped parts in the region of the first part bearing seat, the exterior shapes being arranged in a flush manner in order to configure the annular bearing seat which is stepless in the circumferential direction.

The first part bearing point is therefore not of continuous configuration in the circumferential direction, but rather has the longitudinal slots which divide the first part bearing point into the two circular segment-shaped parts. These two circular segment-shaped parts can be manufactured, for example, by an axial end of the rotor shaft being slotted partially in the axial direction. In order to complete a circular outer contour of the annular bearing seat, the two fork legs of the second part bearing seat are provided which can be pushed axially into the longitudinal slots. Here, the exterior shapes of the circular segment-shaped parts and the fork limbs are arranged in a flush manner.

In one development of the disclosure, the main body has a fork bridge, which connects the fork limbs, and a fork shank, on which the at least one slip ring is arranged and to which the at least one slip ring is connected mechanically. The main body can be formed from steel, for example. In particular, in order to integrate the connector wires into the second part bearing point, the fork limbs have through openings or bores, through which in each case one connecting wire for one of the slip rings is routed within a fork limb and is therefore arranged within the respective fork limb. Ends of the connector wires for connecting to the rotor windings can be of angled configuration with respect to the fork limbs.

The connector wires can be inserted, for example, with the main body and the slip rings into a casting mold and can then be cast with a casting compound. Here, the casting compound forms an insulation of the connector wires and a support for the slip rings. Moreover, the components are connected mechanically by means of the casting compound. In the plugged-together state of the part bearing points, the connector wires which are arranged in the fork limbs are routed through the longitudinal slots in the axial direction and are connected mechanically and electrically below the bearing seat to connectors of the rotor windings.

The two circular segment-shaped parts are particularly preferably connected mechanically via a web which is pressed in between the fork limbs after the part bearing points are plugged together in order to configure a non-positive, press-fitted connection. Here, an axial height of the web is lower than an axial height of the circular segment-shaped parts. When the part bearing points are plugged together, the web is pressed in between the fork limbs. To this end, a width of the web is greater than a spacing of the fork limbs from one another.

The embodiments proposed in relation to the assembly according to the disclosure and their advantages apply correspondingly to the rotor according to the disclosure.

Further features of the disclosure result from the claims, the figures and the description of the figures. The features and combinations of features mentioned above in the description and the features and combinations of features mentioned in the following text in the description of the figures and/or shown only in the figures can be used not only in the respectively specified combination, but rather also in other combinations or on their own.

The disclosure will now be explained in greater detail on the basis of one exemplary embodiment and with reference to the drawings, in which:

4

Figures 4, 5:
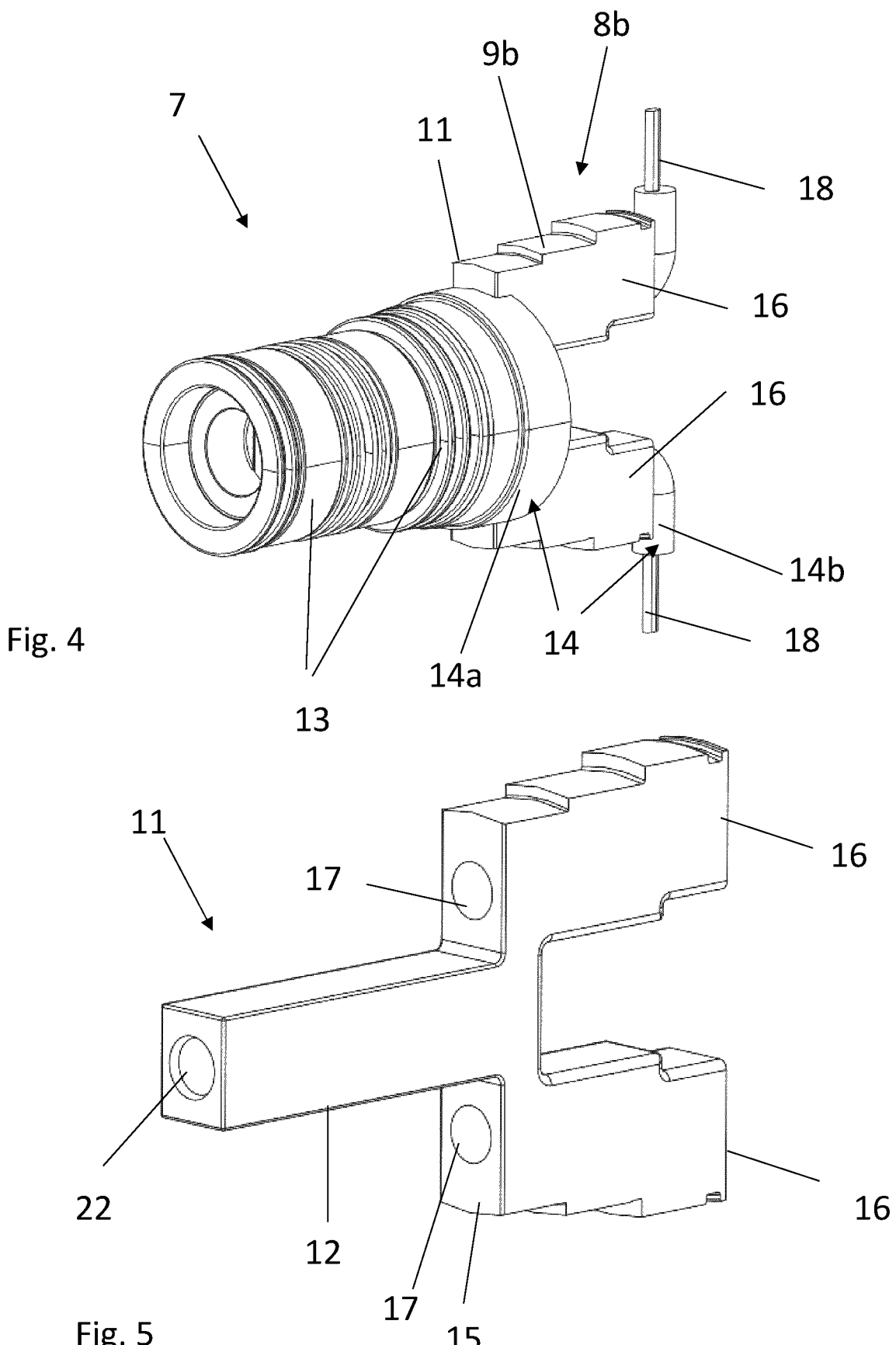
Figure 6:
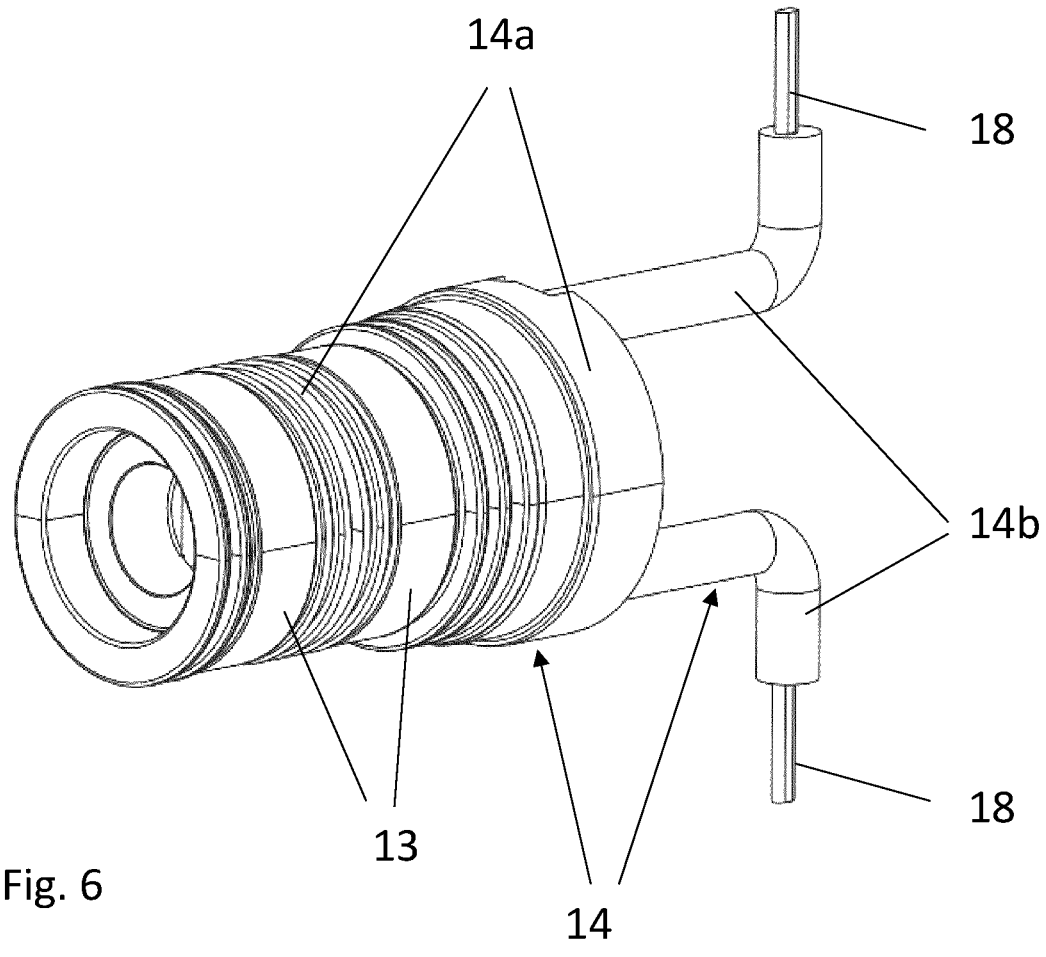
Figure 7:
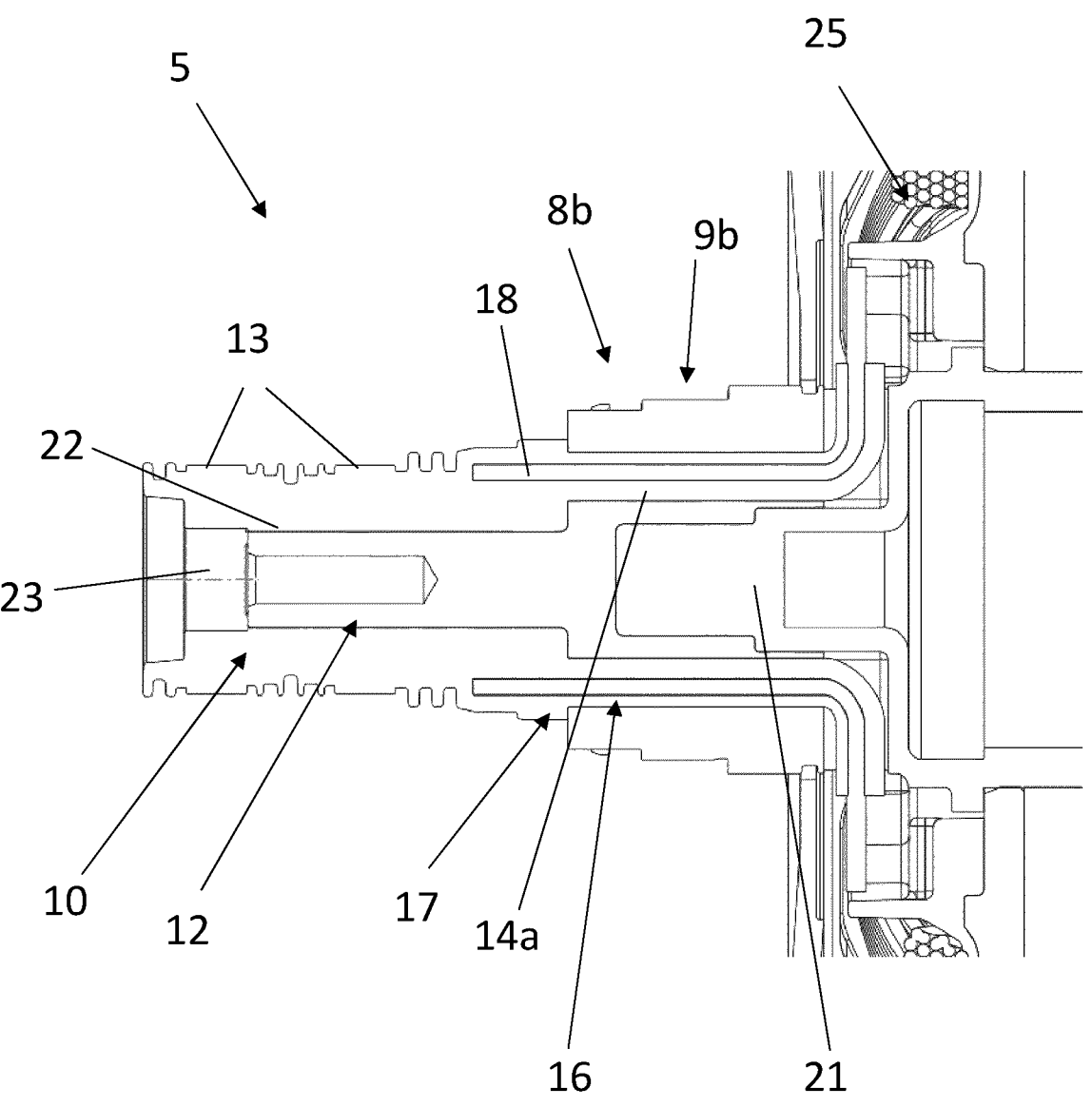
Figure 8:
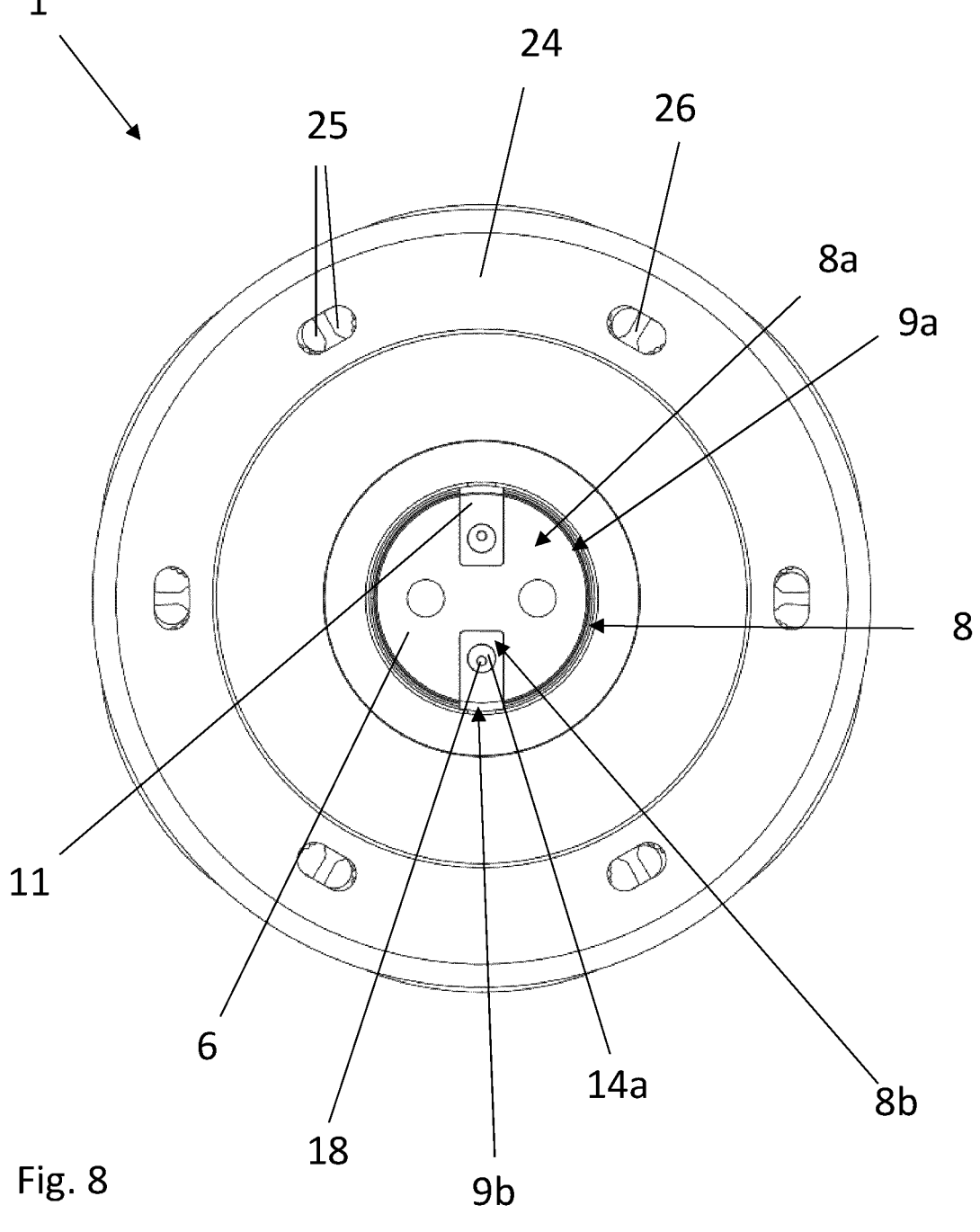

FIG. 4 shows a perspective illustration of a slip ring module of the assembly,

FIG. 5 shows a perspective illustration of a main body of the slip ring module,

FIG. 6 shows a perspective illustration of slip rings and connector wires of the slip ring module which are connected to one another by casting, FIG. 7 shows a detail of a side sectional view of the assembly, and FIG. 8 shows a plan view of the rotor.

DETAILED DESCRIPTION OF THE DRAWINGS

In the figures, identical and functionally identical elements are provided with the same designations.

Figure 1:
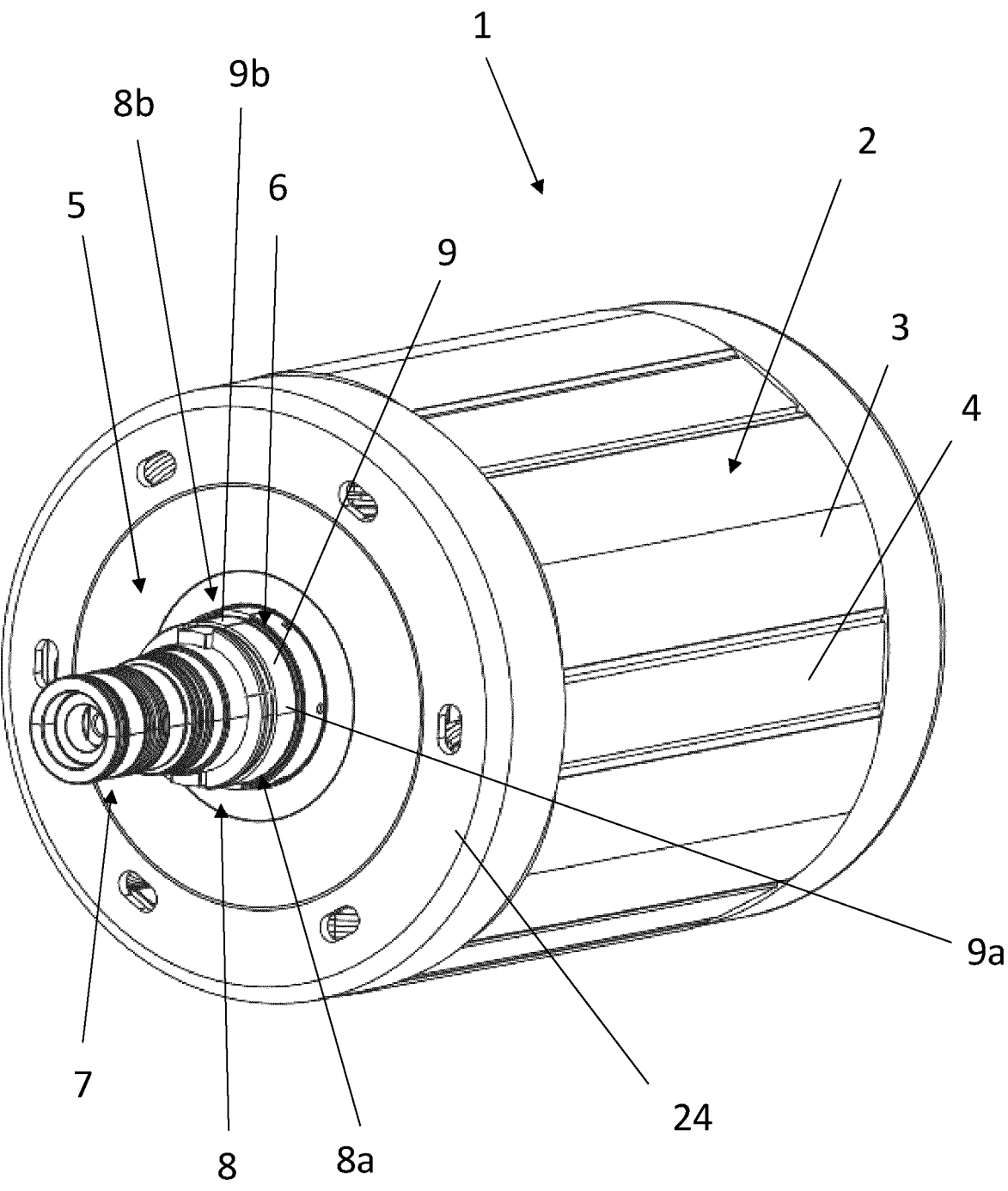
FIG. 1 shows a diagrammatic perspective illustration of a rotor for an electric machine.

FIG. 1 shows a rotor 1 for an electrically excited machine, for example a current-energized synchronous machine (SSM) which can serve, for example, as a traction machine of an electrified motor vehicle. The rotor 1 has a rotor core 2 in the form of a laminated core for maintaining and conducting a magnetic flux of rotor windings (not visible here). Here, the rotor 1 is manufactured in a salient pole design and has salient poles 3, around which the rotor windings are wound. Grooves between the salient poles 3 are closed by way of sliding covers 4 or groove closure wedges.

Figure 2:
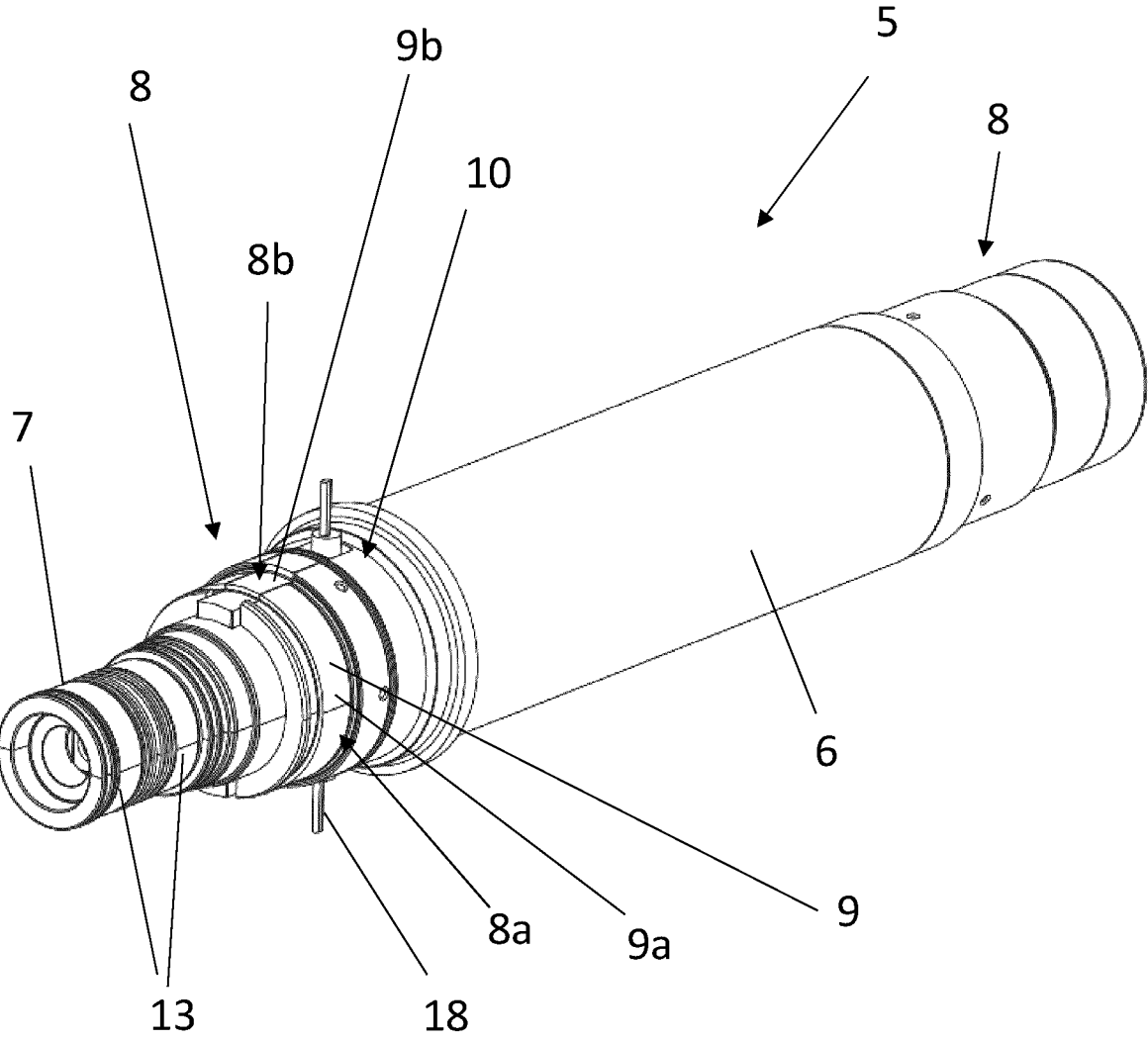
FIG. 2 shows a perspective illustration of an assembly for the rotor.

Moreover, the rotor 1 has an assembly 5 which is shown in FIG. 2 and which is connected fixedly to the laminated core 2 for conjoint rotation. The assembly 5 has a rotor shaft 6 which is routed axially through the laminated core 2 and is connected to the laminated core 2 for the transmission of torque to a drive axle of the motor vehicle, and a slip ring module 7 for energizing the rotor windings. Moreover, the assembly 5 has two bearing points 8 each with a bearing seat 9 for two bearings (not shown here) of the rotor 1, by means of which the rotor 1 is mounted rotatably with respect to a stator of the electric machine. The bearings can be, for example, anti-friction bearings; their inner rings are connected to the respective bearing seat 8 and their outer rings are connected to a housing of the electric machine.

Figure 3:
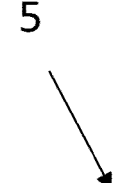
FIG. 3 shows a perspective illustration of the assembly in the unplugged state.

Here, the bearing point 8 which faces the slip ring module 7 is of multiple-part configuration and has a first part bearing point 8a with a first annular part bearing seat 9a and a second part bearing point 8b with a second annular part bearing seat 9b. As shown in FIG. 3, the first part bearing point 8a is configured in one part with the rotor shaft 6 and, as shown in FIG. 4, the second part bearing point 8b is configured in one part with the slip ring module 7. Here, the first part bearing point 8a is configured, in particular, by way of a correspondingly formed, axial end 10 of the rotor shaft 6. The second part bearing point 8b is configured by means of a fork-shaped main body 11, for example of a steel main body, which is shown in FIG. 5, the fork shank 12 of which is fitted with two slip rings 13. For the connection of the main body 11 to the slip rings 13 in order to form the single-part slip ring module 7 in a manner which is mechanical, permanent and non-releasable without destruction, the slip ring module 7 additionally has a casting compound 14, with which the slip rings 13 and the main body 11 are connected by casting and which configures a plastic support 14a for the slip rings 13.

Moreover, the main body 11 has a fork bridge 15 and two fork limbs 16. The fork limbs 16 have axial through openings 17. Connector wires 18 are routed through these through openings 17, which connector wires 18 are connected electrically to in each case one of the slip rings 13 which are arranged on the fork shank 12 and can be connected electrically to connectors of the rotor windings. Ends of the connector wires 18 are angled away with respect to the fork limbs 16 and extend in the radial direction. The connector wires 18 are encapsulated in regions by the casting compound 14, with the result that the latter configures an electrically insulating cable sheath 14*b*. FIG. 6 shows the slip ring module 7 without the main body 11, that is to say only the slip rings 13, the casting compound 14 and the connector wires 18.

In order to produce the slip ring module 7, the main body 11, the connector wires 18 and the slip rings 13 can be arranged in a casting mold in such a way that the connector wires 18 are plugged with the angled-away ends from below into the through openings 17, the slip rings 13 are arranged on the fork shank 12, and the connector wires 18 are contacted electrically with the slip rings 13 here. In this arrangement, the main body 11, the connector wires 18 and the slip rings 13 are cast by way of the casting compound 14. As a result, the plastic carrier 14*a* and the cable sheath 14*b* are formed. It can also be the case, however, that the bent-over connector wires 18 which have already been encapsulated and are contacted with the slip rings 13 are plugged from above through the through openings 17 and their ends are subsequently bent. Subsequently, the slip rings 13 are connected mechanically to the main body 11.

The fork limbs 16 configure the second part bearing point 8*b* which can be plugged axially together with the first part bearing point 8*a* and can therefore be connected in a positively locking manner. FIG. 3 shows the part bearing points 8*a*, 8*b* in the unplugged state. The first part bearing point 8*a* has two circular segment-shaped parts 19 which are separated from one another by way of two axial longitudinal slots 20. These longitudinal slots 20 form grooves for the connector wires 18 which have to be routed below the bearing point 8 from the slip rings 13 to the rotor windings. The bearing point 8 is interrupted in the circumferential direction by way of the groove and leads to increased mechanical loading of the bearing and to increased frictional losses in the bearing.

In order to reduce this effect to an insignificant magnitude, the slip ring module 7 has the (steel) main body 11 which is additionally connected via a locating fit to the rotor shaft 6. To this end, the fork limbs 16 are plugged axially into the longitudinal slots 20, the width of which corresponds to the width of the fork limbs 16, with the result that the result is the bearing point 8 which is shown in FIG. 2 with the annular bearing seat 9. In this way, the part bearing points 8*a*, 8*b* are connected not only in a positively locking manner, but rather also in a non-positive manner. Here, the non-positive connection is a press fit which results from the fact that a web 21 which is configured between the circular segment-shaped parts 19 in the end 10 of the rotor shaft 6 is pressed between the fork limbs 16 during plugging together.

FIG. 7 shows a side sectional view of the assembly 5 in the region of the bearing point 8. The fork shank 12 can likewise have a through opening 22, in which a fastening element 23 for holding the slip rings 13 on the fork shank 12 is arranged.

In order to provide a circular outer contour of the bearing seat 9 which is as smooth as possible and is stepless in the circumferential direction and therefore in order to compensate for the jump in rigidity as a result of the groove in the rotor shaft 6, the circular segment-shaped parts 19 and the fork limbs 16 have the same exterior shapes at least in the region of the part bearing seats 9*a*, 9*b*. In the axial direction, the bearing point 8 has steps here which configure, for example, stop and centering surfaces for the bearing, a seal and a securing ring.

In the joined-together state of the assembly 5 with the laminated core 2, as is also shown in the plan view in FIG. 8, supporting rings 24 are arranged, moreover, on the axially opposite end sides of the laminated core 2. These supporting rings 24 encapsulate winding heads 25 which configure the rotor windings on the axially opposite end sides of the laminated core 2. A casting compound for fastening the supporting rings 24 to the winding heads 25 is filled via filling openings 26 in the supporting rings 24.

What is claimed is:

1. An assembly for a rotor of an electrically excited electric machine comprising:
   a rotor shaft which is fixedly connectable to a rotor core of the rotor to thereby conjointly rotate;
   a slip ring module having at least one slip ring configured to energize rotor windings of the rotor; and
   two bearing points arranged at axial ends of the rotor shaft with one annular bearing seat of one bearing of the rotor, wherein
      one of the bearing points is of two-part configuration, a first part bearing point having a first part bearing seat and is configured in one part with the rotor shaft, and a second part bearing point having a second part bearing seat and being configured in one part with the slip ring module, the two part bearing points with the part bearing seats being connected in a positively locking and non-positive manner with configuration of the bearing point with the annular bearing seat,
      the two-part bearing points engage into one another in a claw-like manner in order to provide the positively locking connection, and
      the first part bearing point has two circular segment-shaped parts which are separated via longitudinal slots, and the second part bearing point is configured via two fork limbs of a fork-shaped main body which are pushed axially into the longitudinal slots, an exterior shape of the fork limbs in the region of the second part bearing seat corresponding to an exterior shape of the circular segment-shaped parts in a region of the first part bearing seat, and the exterior shapes being arranged in a flush manner in order to configure the annular bearing seat which is stepless in the circumferential direction.

2. The assembly according to claim 1, wherein the part bearing points are plugged together axially in order to configure the positively locking connection and are press-fitted in order to configure the non-positive connection.

3. The assembly according to claim 1, wherein connector wires of the slip ring module which are connected to the at least one slip ring configured to energize the rotor windings are integrated into the second part bearing point, and are routed through the bearing point in the connected state of the two-part bearing points.

4. The assembly according to claim 1, wherein the first part bearing point is configured as a shaped, axial end of the rotor shaft.

5. The assembly according to claim 1, wherein the main body has a fork bridge, which connects the fork limbs, and a fork shank, onto which the at least one slip ring is pushed and to which the at least one slip ring is connected mechanically.

6. The assembly according to claim 1, wherein
the slip ring module has two slip rings and two connector
  wires, the fork limbs having through openings, through
  which one connector wire is routed within a fork limb.

7. The assembly according to claim 6, wherein
the slip rings, the main body and the connector wires are
  connected mechanically via a casting compound with
  the configuration of the single-part slip ring module.

8. The assembly according to claim 1, wherein
the two circular segment-shaped parts are connected
  mechanically via a web which is pressed in between the
  fork limbs after the part bearing points are plugged
  together in order to configure a non-positive, press-
  fitted connection.

9. A rotor for an electrically excited electric machine,
comprising:
  a rotor core;
  rotor windings which are held by the rotor core;
  two bearings; and
  the assembly according to claim 1.

* * * * *